US007807008B2

(12) United States Patent
Nethers, II et al.

(10) Patent No.: US 7,807,008 B2
(45) Date of Patent: Oct. 5, 2010

(54) COATED FABRIC CONTAINING RECYCLED MATERIAL AND METHOD FOR MANUFACTURING SAME

(75) Inventors: John W. Nethers, II, Louisville, KY (US); John D. Serafano, Louisville, KY (US); Edward M. Ernst, Louisville, KY (US)

(73) Assignee: Laminating Services, Inc., Louisville, KY (US)

( * ) Notice: Subject to any disclaimer, the term of this patent is extended or adjusted under 35 U.S.C. 154(b) by 508 days.

(21) Appl. No.: 11/807,554

(22) Filed: May 29, 2007

(65) Prior Publication Data

US 2008/0299853 A1 Dec. 4, 2008

(51) Int. Cl.

| | |
|---|---|
| ***B29C 65/00*** | (2006.01) |
| ***B32B 37/00*** | (2006.01) |
| ***B32B 38/10*** | (2006.01) |
| ***B32B 38/04*** | (2006.01) |
| ***B32B 43/00*** | (2006.01) |
| ***B29B 27/00*** | (2006.01) |
| ***B65C 9/25*** | (2006.01) |
| ***C09J 5/00*** | (2006.01) |
| ***B29C 73/00*** | (2006.01) |
| ***D03D 15/00*** | (2006.01) |
| ***D03D 25/00*** | (2006.01) |

(52) U.S. Cl. ....................... 156/278; 156/153; 156/265; 156/269; 156/324; 264/36.1; 442/181

(58) Field of Classification Search ................ 156/62.2, 156/62.4, 62.6, 62.8, 72, 148, 153, 166, 168, 156/180, 250, 256, 264, 265, 269, 270, 278, 156/279, 280, 324; 264/36.1, 36.18, 37.1, 264/37.28, 103; 442/43, 45, 57, 58, 59, 181, 442/239, 246, 255, 267
See application file for complete search history.

(56) References Cited

U.S. PATENT DOCUMENTS 4,483,488 A * 11/1984 Luff et al. ..................... 241/19

(Continued)

FOREIGN PATENT DOCUMENTS

JP 5569661 5/1980

(Continued)

OTHER PUBLICATIONS

"Give Your Old Wallcovering a Second Life, Versa Second-Look Retrieval Program," Interior Design, Oct. 31, 2005, vol. 76, No. 13, p. 68.

(Continued)

*Primary Examiner*—Richard Crispino
*Assistant Examiner*—Brian R Slawski
(74) *Attorney, Agent, or Firm*—Kilpatrick Stockton LLP

(57) ABSTRACT

A three layer coated fabric has a bottom backing layer, a top coating layer and a middle coating layer that contains recycled coated fabric material. All of the constituent parts of coated fabrics being recycled are included in the middle layer. The middle layer also sometimes contains other materials that can blend with the recycled coated fabrics or other recycled post-consumer materials. The three layer coated fabric is manufactured by transforming the recycled coated fabrics and other materials into a form that can be used to create the middle layer.

22 Claims, 2 Drawing Sheets

10

40

30

20

U.S. PATENT DOCUMENTS

| | | | |
|---|---|---|---|
| 5,091,055 | A | 2/1992 | Fredenucci et al. |
| 5,965,198 | A | 10/1999 | Plusquellec et al. |
| 6,316,075 | B1 | 11/2001 | Desai et al. |
| 2002/0025414 | A1 | 2/2002 | Desai et al. |
| 2004/0040680 | A1 | 3/2004 | Iwasaki |

FOREIGN PATENT DOCUMENTS

| | | | |
|---|---|---|---|
| JP | 5147035 | | 6/1993 |
| JP | 5247863 | | 9/1993 |
| JP | 6126745 | | 5/1994 |
| JP | 08025582 A | * | 1/1996 |
| JP | 2005-246762 | * | 9/2005 |

OTHER PUBLICATIONS

"Recycling Program Accepts Vinyl Wallcovering," Environmental Design + Contruction, Apr. 1, 2006.

"Recycle, Reuse, Rethink Wallcovering, Versa Wallcovering, Second Look Recycled Wallcovering," Interior Design, Oct. 2006, vol. 77, No. 12, p. 111.

* cited by examiner

COATED FABRIC CONTAINING RECYCLED MATERIAL AND METHOD FOR MANUFACTURING SAME

BACKGROUND OF THE INVENTION

1. Field of the Invention

The inventions described herein relate to a coated fabric that contains recycled coated fabric material and/or other post consumer recycled materials and a method for manufacturing such coated fabric.

2. Description of the Related Art

Coated fabrics are used extensively in products such as, for example, wallcoverings, awnings, upholstery, tarpaulins, billboards and signs, digitally or screen printed media, swimming pool liners, roofing membranes and ceiling coverings. Prior coated fabrics have two layers: a backing or fabric layer and a top or coating layer.

The backing layer is sometimes referred to as a fabric but the backing can be any material onto which another material can be applied. In other words, the term “fabric” in the phrase “coated fabrics” is used in a generic way to refer to the backing layer. Examples of backing layers are woven fabrics, non-woven papers, scrims, osnaburgs, drills and wet-laid or spun non-woven material.

The top layer is sometimes referred to as a coating but the top layer can be any material that can be applied onto the backing layer. In other words, the term “coated” in the phrase “coated fabrics” is used in a generic way to refer to the top layer. An example of a top layer material widely used with coated fabrics is poly-vinyl chloride (“PVC” or “vinyl”). In addition, other polymeric coatings can be used as a top layer material. In some cases, the top layer material must also be able to have a consistent color and be able to undergo conversion or finishing operations such as, for example, printing, embossing, coating, spanishing or laminating. Of course, both the bottom backing layer and the top coating layer materials must be flexible enough to allow the coated fabric to be used for its intended purpose, such as, for example, a wallcovering, an awning, upholstery, a tarpaulin, a billboard or sign, a digitally or screen printed media, a swimming pool liner, a roofing membrane or a ceiling covering.

The application of the top layer to the bottom layer is sometimes referred to as a coating operation but the application can be done in a number of manners that may not literally be a coating operation. In other words, the phrase “coating operation” is used in a generic way to refer to applying a top layer to the backing. Examples of application operations are laminating, calendering, extrusion coating, plastisol coating, reverse roll coating, knife-over-roll coating or direct gravure coating.

A problem with coated fabrics is the coating materials are not biodegradable and take up space in land-fills. As a result, coated fabric manufacturers and users are concerned with disposal of used or post-consumer, scrap, process scrap, misprinted, dead, overstocked or otherwise unusable coated fabrics, and they are especially concerned with the disposal costs and impact to the environment. Those concerns have led to various attempts to recycle such materials into a reusable form.

Most prior recycling efforts concentrated on separating out the coating material from the fabric backings. For example, U.S. Pat. No. 4,483,488 discloses a process of freezing and impacting a coated fabric material to separate the PVC coating from the fabric backing. Another example is Japanese Patent No. JP5-247863, which discloses a method of using air to pulverize paper impregnated with resin to separate the paper and the resin. Those recycling methods, however, can be costly and still create waste, i.e., the non-recycled backing materials.

Another prior recycling method was to apply a new coating over old sheets of vinyl or sheets of coated fabrics. The resulting coated fabrics, however, were very heavy and hard to handle and use. As a result, the market did not readily accept such products.

Unlike the prior recycling methods, the inventions described herein use recycled coated fabrics that include both the coating material and the fabric backing of the recycled coated fabrics, and, thus, do not create any waste material.

SUMMARY OF THE INVENTION

The inventions described herein include three layer coated fabrics and methods to manufacture the coated fabrics. The new coated fabrics have three layers. The bottom layer is a backing layer, and the top layer is a coating layer. In between those two layers is a middle layer. The middle layer is made from recycled coated fabrics and sometimes is made with other materials that blend with the recycled coated fabric materials such as post-consumer recycled materials. The recycled coated fabrics may be used or post-consumer, scrap, process scrap, misprinted, dead or overstocked or otherwise unusable coated fabrics. In all cases, all of the constituent parts of coated fabrics being recycled are included in the middle layer. The post-consumer recycled materials can be coated fabrics that were used by a consumer or other materials that were used by a consumer such as gypsum board a/k/a dry wall.

By way of example, wallcoverings can be made in accordance with the inventions described herein. Such wallcoverings have: a backing layer, a top layer made of vinyl and a middle layer made from recycled wallcoverings that are sometimes mixed with other materials that blend with the recycled coated fabric materials such as recycled post-consumer materials.

The new coated fabric manufacturing process uses all the constituent parts of recycled coated fabrics to make a new coated fabric. The process starts with collecting coated fabrics that may be used or post-consumer, scrap, process scrap, misprinted, dead or overstocked or otherwise unusable coated fabrics. Next, the coated fabrics are fed into a series of machines that turn the coated fabrics into smaller and smaller pieces and, in some cases, into a fluff or powder. Then, in some cases, the recycled coated fabric materials are mixed with other materials that blend with the recycled coated fabric materials such as recycled post-consumer materials, which can be recycled coated fabrics or recycled gypsum board a/k/a dry wall. Next, a series of machines turns those smaller pieces, fluff or powder into a coating that is applied to a new backing material where the backing layer is a bottom layer and the coating is a middle layer. Next, a new top coating is applied over the exposed face of the middle layer to form a three layer coated fabric.

An object of the inventions is to provide a coated fabric that contains recycled coated fabrics.

Another object of the inventions is to provide a coated fabric that contains recycled post-consumer materials.

Another object of the inventions is to provide a coated fabric that contains recycled materials and has a top layer that is capable of undergoing conversion or finishing operations.

Another object of the inventions is to provide a three layer coated fabric where the middle layer contains recycled coated fabrics and/or recycled post-consumer materials.

Another object of the inventions is to provide a coated fabric that contains recycled coated fabrics and/or recycled post-consumer materials and that is suitable for consumer use.

Another object of the inventions is to provide a coated fabric that contains recycled coated fabrics and/or recycled post-consumer materials and that meets construction and recycling standards and codes.

Another object of the inventions is to provide a manufacturing method to recycle coated fabrics and to use the recycled coated fabrics to make new coated fabrics.

Another object of the inventions is to provide methods to recycle used or post-consumer, scrap, process scrap, misprinted, dead or overstocked or otherwise unusable coated fabrics or other materials and to use the recycled materials to make new coated fabrics.

BRIEF DESCRIPTION OF THE DRAWINGS

The accompanying drawings illustrate the inventions described herein and, together with the Detailed Description below, help to describe the inventions. The reference numerals in the drawings refer to the same or like elements and are used in the Detailed Description to refer to the same or like elements. Below are brief descriptions of the drawings.

DETAILED DESCRIPTION OF THE PREFERRED EMBODIMENTS

Figure 1:
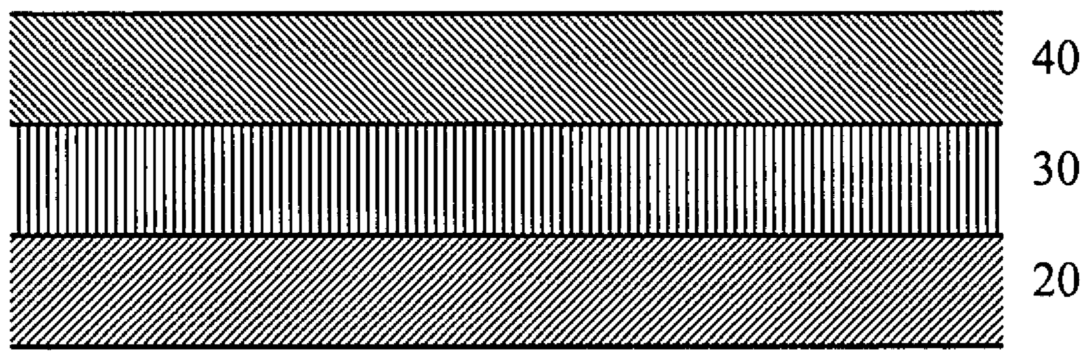
FIG. 1 is a side cross-sectional view of a coated fabric in accordance with an embodiment of the present invention.

FIG. 1 illustrates a cross-section view of a coated fabric 10. The bottom backing layer 20 is made of any material onto which another material can be applied. Many different materials are used as backings for coated fabrics. Backing layers can be, for example, woven fabrics, non-woven papers, scrims, osnaburgs, drills and wet-laid or spun non-woven material.

The top layer 40 is made of any material that can be applied to the middle layer 30. In addition, for some applications, the top layer material must be able to have a consistent color and be able to undergo conversion or finishing operations such as, for example, printing, embossing, coating, spanishing or laminating. Examples of top layer materials are vinyl and other polymeric coatings.

The middle layer 30 contains recycled coated fabrics. All of the constituent parts of coated fabrics being recycled are included in the recycled coated fabrics used in the middle layer 30. The middle layer 30's composition can be one hundred percent (100%) recycled coated fabrics or a mixture of recycled coated fabrics and other materials that blend with the recycled coated fabrics such as recycled post-consumer materials. The sources of the recycled coated fabrics include, for example, used or post-consumer, scrap, process scrap, misprinted, dead or overstocked or otherwise unusable coated fabrics. The post-consumer recycled materials can be coated fabrics' that were used by a consumer or other materials that were used by a consumer such as gypsum board a/k/a dry wall.

The three layer coated fabric 10 illustrated in FIG. 1 can be used in any coated fabric application such as, for example, wallcoverings, awnings, upholstery, tarpaulins, billboards and signs, digitally or screen printed media, swimming pool liners, roofing membranes and ceiling coverings. For example, the three layer coated fabric 10 can be wallcoverings. The bottom layer 20 of such wallcoverings can be either a woven fabric or a non-woven paper backing material. The middle layer 30 of such wallcoverings can be a mixture containing up to seventy five (75%) recycled wallcoverings and vinyl. The recycled wallcoverings used in the middle layer can include both the backings and vinyl coatings of prior wallcoverings. In addition, the recycled wallcoverings can include post-consumer or used wallcoverings or other recycled post-consumer materials such as gypsum board a/k/a dry wall that is collected from consumers. The top layer 40 of such wallcoverings can be vinyl that has a consistent color and can be finished with standard conversion operations such as printing and embossing. An example of such wallcoverings is LSI (Laminating Services, Inc.) Wallcovering's Second-Look Recycled Wallcoverings, which contain at least twenty percent (20%) recycled content with a minimum of ten percent (10%) post-consumer recycled materials.

The weights or thicknesses of each layer in the three layer coated fabric 10 may vary from one coated fabric application to another application (e.g., wallcoverings, awnings, upholstery, tarpaulins, billboards and signs, digitally or screen printed media, swimming pool liners, roofing membranes and ceiling coverings). In all cases, however, a goal for the middle layer is to use as much recycled material as possible, which may be dictated by, for example, the application, manufacturing or aesthetic limitations. An example of an application limitation is one application may require a heavy backing layer while other applications may be able to use a light weight engineered backing material. An example of a manufacturing limitation is some machines may only be able to produce layers of certain weights or thicknesses. An example of an aesthetic limitation is some applications may require the top layer to be a minimum weight or thickness to allow for conversion or finishing operations and to prevent the middle layer from showing through the top layer.

To illustrate the above concepts, below is a description of exemplary 20 Ounces wallcoverings. (The term "Ounces" as used herein is a common measurement term used in the wallcovering industry. The term refers to the ounces of material per linear yard of standard wallcovering, which is 54 inches wide. Thus, 20 Ounces wallcoverings refers are wallcoverings that have 20 Ounces of material per yard of wallcovering, which is 54 inches wide.) Such wallcoverings commonly use backings whose weight is between two and four Ounces. The top layer for such wallcoverings must be heavy or thick enough to prevent the middle layer from showing through the top layer and to allow conversion or finishing operations to be performed on the top layer. To accomplish those objectives, the top layer should be between eight and eleven Ounces. In view of the weights of the backing and top layers and in order to create a 20 Ounces wallcovering, the middle layer weight will range from six to ten Ounces. Those ranges may also vary depending on the manufacturing capabilities of the machines used to make each layer since some machines may only be able to make layers up to a certain weight, e.g., 10 Ounces. Of course, one of ordinary skill in the art can readily design the weights of each of the three layers in the coated fabric 10 to meet the various needs for a coated fabric application, to use whatever raw materials and recycled coated fabrics are available, and to work within any manufacturing limitations that are presented such as machine, production run or economic limitations.

Figure 2:
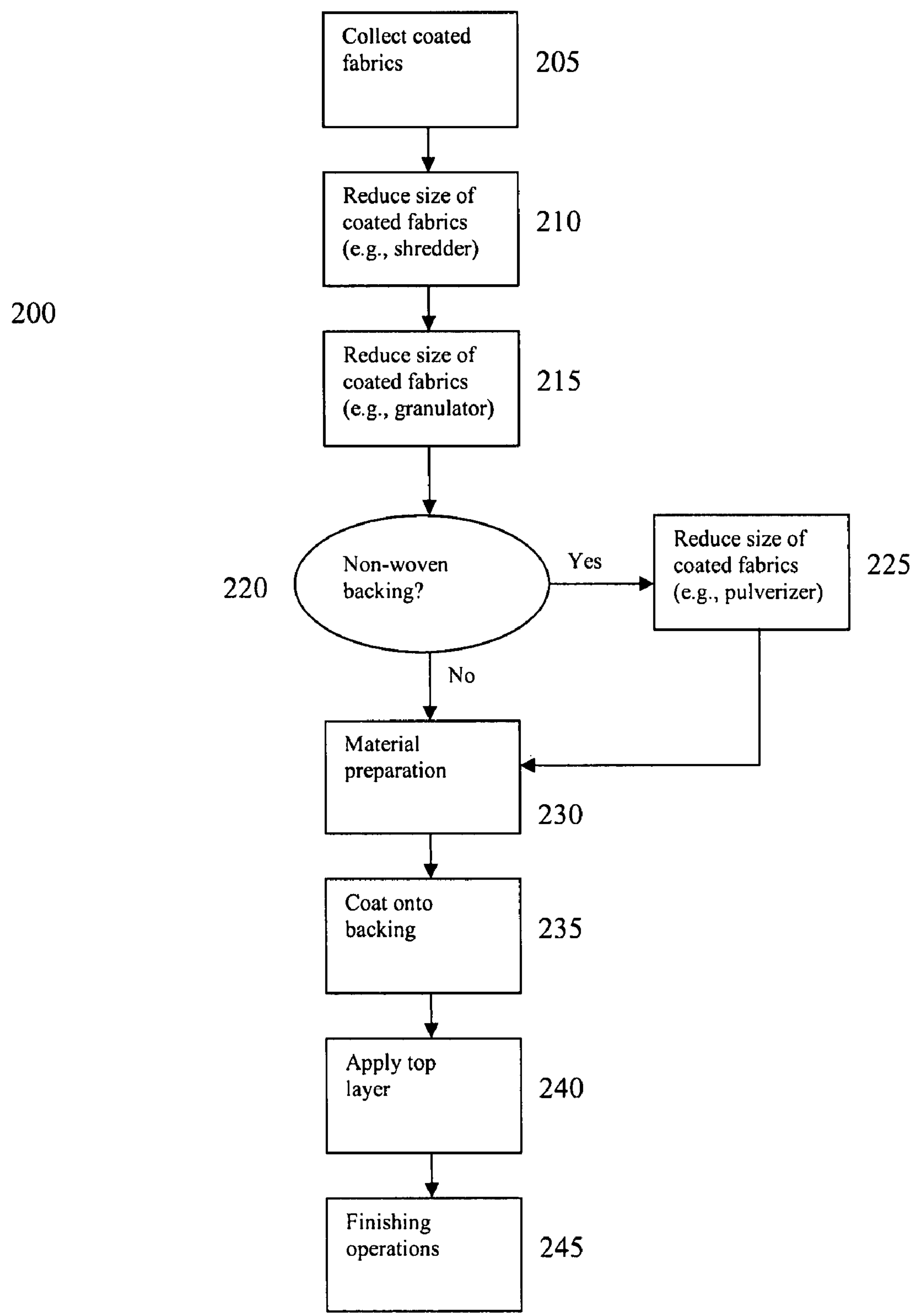
FIG. 2 is flow chart showing a process to manufacture a coated fabric in accordance with an embodiment of the present invention.

FIG. 2 illustrates a flow chart for a coated fabric manufacturing process 200. The manufacturing process begins with transforming coated fabrics into a material that can be used to make new coated fabrics. Unlike prior methods, the present inventions use the entirety of coated fabrics, i.e., the backing and coating layers. Below is a description of the steps illustrated in FIG. 2.

Step 205 is to collect used or post-consumer, scrap, process scrap, misprinted, dead or overstocked or otherwise unusable coated fabrics.

The next series of steps transform the coated fabrics into a material that can be used to make the middle layer 30 shown in FIG. 1. The next series of steps accomplishes that goal by, in part, reducing the coated fabric into smaller and smaller pieces, which, as is well known in the art, can be accomplished in any number of manners and with any number of machines.

Step 210 is to shred the collected coated fabrics. Step 210 will cut the coated fabrics into pieces that are nominally one to two inches in size. An example of a machine to perform step 210 is a Vecoplan Single Shaft Shredder.

Step 215 is to granulate the shredded coated fabrics. Step 215 will further reduce the size of the shredded coated fabrics into pieces that are nominally one quarter to one half inch in size. An example of a machine to perform step 215 is a Cumberland granulator.

Step 220 is a question regarding whether the granulated coated fabrics came from coated fabrics that used a woven (e.g., fabric) or non-woven (e.g., paper) backing? If yes, the next step is step 225. If the answer is no, the next step is step 230.

Step 225 is to pulverize the granulated coated fabrics. Step 225 will further reduce the size of the granulated coated fabrics into pieces that are nominally 25 microns in size. In other words, the resulting material has a fluffy-like consistency and is a mixture of a powder-like material (mostly from the coating of the coated fabrics) and a filler-like material (mostly from the non-woven backing of the coated fabrics). An example of a machine to perform step 225 is a Jacobsen Air-swept pulverizer.

Step 230 is to prepare the granulated or pulverized coated fabrics for application to the backing layer 20. One of ordinary skill in the art will understand any number of steps can be performed in Step 230 or no steps may be performed. For example, one may wish to modify the processability, the color consistency or the physical properties of the granulated or pulverized coated fabrics. To modify the processability, one may add plasticizer. To modify the color consistency, one may add titanium dioxide to lighten very dark granulated or pulverized coated fabrics. To modify the physical properties, one may add materials to improve flame or smoke resistance. Another example is one may wish to add recycled post consumer materials such as coated fabrics that were used by a consumer or other materials that were used by a consumer such as gypsum board a/k/a dry wall. If materials are added to the granulated or pulverized coated fabrics, then the new materials and the granulated or pulverized coated fabrics need to be mixed. An example of a machine to perform the mixing is a horizontal ribbon blender.

Step 235 is to apply onto the backing layer 20 the granulated or pulverized coated fabrics from step 230 to create a middle layer 30. Step 235 will turn the granulated or pulverized coated fabrics from step 230 into a material that can be applied to the backing layer 20. An example of a machine to perform step 235 is a Bema 3 roll inverted-L calendar. Other machines and operations can be used to apply the middle layer 30 such as, for example, laminating, calendering, extrusion coating, plastisol coating, reverse roll coating, knife over roll coating or direct graveure coating machines and operations.

Step 240 is to apply onto the exposed face of the middle layer 30 a top layer 40. Examples of machines that can perform step 235 are a Bema 3 roll inverted-L calendar and a Lembo Inc. or a Liberty Machines Works laminator. The other machines and operations noted in the prior paragraph can also be used to apply the top layer 40 to the middle layer 30.

Step 245, which is optional, is to convert or finish the top layer 40. Examples of conversion or finishing operations are printing, embossing, coating, spanishing or laminating One of skill in the art will understand the above steps can be varied and still accomplish the goals of the steps outlined above. For example, one may use one step (e.g., granulator) and not another step (e.g., pulverizer) because machinery is unavailable or the economics of a production run dictate not using a certain machine.

In addition, one of skill in the art will understand one can use any machines to accomplish the above steps and can arrange and connect the machines in any well known manner. For example, in some situations, one may connect a shredder and a granulator using standard conveyors, and, in other situations, one may not connect a shredder and a granulator and will manually carry the output of the shredder to the granulator.

The three layer coated fabrics and manufacturing processes described above have several benefits. For example, the three layer coated fabrics and manufacturing processes can have a positive environmental impact since they use recycled coated fabrics that includes of all the constituent parts of those coated fabrics and not just the coating layer as in prior methods. Moreover, the three layer coated fabrics and manufacturing processes can also use other recycled post-consumer materials. Thus, the three layer coated fabrics and manufacturing processes reduce waste, especially waste heading to land fills.

In addition, the three layer coated fabrics and manufacturing processes will lead to cost savings over time. For example, manufacturers will not have to pay disposal costs for old coated fabrics and, as they recycle old coated fabrics, they can increase their storage space. Further, since the coated fabrics are fully recyclable, a manufacturer can easily market additional products without the fear of creating dead or overstocked coated fabrics.

Another benefit is the three layer coated fabrics can meet various air quality-related and building-related standards. For example, wallcoverings produced using vinyl in accordance with the inventions described herein can meet Low VOC indoor air quality standards when they contain at least twenty percent (20%) recycled content with a minimum of ten percent (10%) post-consumer content. LSI Wallcovering's Second Look products have those minimum percentages and also have no more than 500 micro grams per cubic meter of total volatile organic compounds (TVOC) as measured using tests performed according to ASTM Standard No. 5116. Such wallcoverings meet the State of Washington's Building Specification for Indoor Air Quality and the State of California's Indoor Air Quality Standard (Section 01350).

Another example is wallcoverings produced using vinyl in accordance with the inventions described herein can contribute to meeting U.S. Green Building Council's Leadership in Energy and Environmental Design (LEED) Green Building Rating System. The LEED Green Building Rating System is a series of benchmarks for the design, construction and operation of green buildings. LEED measures performance in five key areas of human and environmental health: sustainable site development, water savings, energy efficiency, materials selection, and indoor environmental quality. Wallcoverings containing at least twenty percent (20%) recycled content with a minimum of ten percent (10%) post-consumer content will contribute to meeting the LEEDS ratings in the areas of Materials and Resources—Recycled Content, Materials and Resources—Construction Waste Management and Indoor Environmental Quality—Low Emitting Materials.

The purpose of the foregoing description of the preferred embodiments is to provide illustrations of the inventions described herein. The foregoing description is not intended to be exhaustive or to limit the inventions to the precise forms disclosed. One of skill in the art will obviously understand many modifications and variations are possible in light of the above principles. The foregoing description explains those principles and examples of their practical applications. The foregoing description is not intended to limit the scope of the inventions that are defined by the claims below.

What is claimed is:

1. A method of manufacturing a wallcovering, comprising the steps of:

a) transforming recycled wallcoverings into a middle coating layer, wherein the recycled wallcoverings comprise multiple layers including a recycled bottom backing layer comprising a woven fabric, and wherein the middle coating layer comprises the multiple layers of the recycled wallcoverings, b) applying to a bottom backing layer the middle coating layer, wherein the bottom backing layer comprises a woven fabric, and c) applying over the middle coating layer a top coating layer, wherein the top coating layer comprises a vinyl material.

2. The method of manufacturing of claim 1 further comprising mixing the recycled wallcoverings with other material that can blend with the recycled wallcovering material.

3. The method of manufacturing of claim 2 wherein the other material is vinyl.

4. The method of manufacturing of claim 2 wherein the other material is recycled post-consumer used coated fabrics.

5. The method of manufacturing of claim 2 wherein the other material is recycled post-consumer materials.

6. The method of manufacturing of claim 1 further comprising converting the top coating layer.

7. The method of manufacturing of claim 1 further comprising reducing in size the recycled wallcoverings.

8. The method of manufacturing of claim 1 wherein applying to a bottom backing layer is calendering.

9. The method of manufacturing of claim 1 wherein applying over the middle coating layer is laminating.

10. The method of manufacturing of claim 1 wherein applying over the middle coating layer is calendering.

11. A method of manufacturing a wallcovering, comprising the steps of:

a) reducing the size of a recycled wallcovering, wherein the recycled wallcovering comprises multiple layers including a recycled bottom backing layer comprising a woven fabric, b) mixing the recycled wallcovering with a coating material, c) applying to a bottom backing layer the mixture of the recycled wallcovering and the coating material to form a middle coating layer, wherein the bottom backing layer comprises a woven fabric, and wherein the middle coating layer comprises the multiple layers of the recycled wallcoverings, and d) applying over the middle coating layer a top coating layer, wherein the top coating layer comprises a vinyl material.

12. The method of manufacturing of claim 11 further comprising mixing the recycled wallcovering with other material that can blend with the recycled wallcovering material.

13. The method of manufacturing of claim 12 wherein the other material is selected from the group consisting of vinyl, recycled post-consumer used coated fabrics, and recycled post-consumer materials.

14. The method of manufacturing of claim 11 wherein applying to a bottom backing layer is calendering.

15. The method of manufacturing of claim 11 wherein applying over the middle coating layer is laminating.

16. A method of manufacturing a wallcovering, comprising the steps of:

a) transforming recycled wallcoverings into a middle coating layer, wherein the recycled wallcoverings comprise a recycled top coating layer comprising a vinyl material, a recycled middle coating layer comprising previously recycled wallcoverings, and a recycled bottom backing layer comprising a woven fabric, and wherein the middle coating layer comprises the recycled top coating layer, the recycled middle coating layer, and the recycled bottom backing layer of the recycled wallcoverings, b) applying to a bottom backing layer the middle coating layer, wherein the bottom backing layer comprises a woven fabric, and c) applying over the middle coating layer a top coating layer, wherein the top coating layer comprises a vinyl material.

17. The method of manufacturing of claim 16 further comprising mixing the recycled wallcoverings with other material that can blend with the recycled wallcovering material.

18. The method of manufacturing of claim 17 wherein the other material is selected from the group consisting of vinyl, recycled post-consumer used coated fabrics, and recycled post-consumer materials.

19. The method of manufacturing of claim 16 further comprising converting the top coating layer.

20. The method of manufacturing of claim 16 further comprising reducing in size the recycled wallcoverings.

21. The method of manufacturing of claim 16 wherein applying to a bottom backing layer is calendering.

22. The method of manufacturing of claim 16 wherein applying over the middle coating layer is laminating.

* * * * *